United States Patent
Michaluk

(10) Patent No.: US 10,556,587 B2
(45) Date of Patent: Feb. 11, 2020

(54) SYSTEM AND METHOD OF MITIGATING ERRORS IN A DEVICE BY USE OF PROPULSION TORQUE

(71) Applicant: GM GLOBAL TECHNOLOGY OPERATIONS LLC, Detroit, MI (US)

(72) Inventor: Nathaniel S. Michaluk, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 199 days.

(21) Appl. No.: 15/671,995

(22) Filed: Aug. 8, 2017

(65) Prior Publication Data

US 2019/0047562 A1    Feb. 14, 2019

(51) Int. Cl.
| | |
|---|---|
| *B60W 30/14* | (2006.01) |
| *B60L 3/00* | (2019.01) |
| *B60L 3/12* | (2006.01) |
| *B60L 15/20* | (2006.01) |
| *B60W 10/08* | (2006.01) |
| *B60W 10/18* | (2012.01) |

(52) U.S. Cl.
CPC ......... *B60W 30/143* (2013.01); *B60L 3/0038* (2013.01); *B60L 3/0061* (2013.01); *B60L 3/0076* (2013.01); *B60L 3/12* (2013.01); *B60L 15/20* (2013.01); *B60W 10/08* (2013.01); *B60W 10/182* (2013.01); *B60W 2540/10* (2013.01); *B60W 2550/12* (2013.01); *B60W 2550/142* (2013.01); *B60W 2710/083* (2013.01); *B60W 2710/182* (2013.01); *B60W 2720/10* (2013.01)

(58) Field of Classification Search
CPC .......... B60L 3/0061; B60L 3/12; B60L 15/20; B60L 3/0038; B60L 3/0076; B60W 10/182; B60W 10/08; B60W 30/143
See application file for complete search history.

(56) References Cited

U.S. PATENT DOCUMENTS

| | | | |
|---|---|---|---|
| 7,801,658 B2 * | 9/2010 | Ohshima | B60K 31/047 123/349 |
| 2002/0111733 A1 * | 8/2002 | Akabori | B60K 31/0008 701/96 |
| 2010/0004843 A1 * | 1/2010 | Yu | B60K 6/48 701/102 |
| 2011/0125294 A1 * | 5/2011 | Yu | B60K 6/48 700/33 |
| 2011/0202234 A1 * | 8/2011 | Bradley | B60K 6/48 701/36 |

* cited by examiner

*Primary Examiner* — Hussein Elchanti
(74) *Attorney, Agent, or Firm* — Quinn IP Law

(57) ABSTRACT

A system and method of mitigating errors in a device includes a controller having a processor and tangible, non-transitory memory on which is recorded instructions. The propulsion source is configured to generate propulsion torque in response to a command by the controller. The controller is configured to determine if at least one predefined enabling condition is met. If at least one predefined enabling condition is met, then the controller is configured to determine if a speed of the device is at a target speed. Operation of the device is controlled based at least partially on the speed of the device. If the speed of the device is above or below the target speed, the controller is configured to determine a propulsion torque sufficient to bring the device to the target speed. The propulsion torque is delivered to the device via the propulsion source.

17 Claims, 3 Drawing Sheets

SYSTEM AND METHOD OF MITIGATING ERRORS IN A DEVICE BY USE OF PROPULSION TORQUE

INTRODUCTION

The present disclosure relates to a system and method of mitigating errors in a device by employing the use of propulsion torque. At various times, a transportation device may require mitigating action, including slowing down the device to allow for subsequent permanent immobilization. At these times, a friction brake may not be available or sufficiently functional to control operation of the device.

SUMMARY

Disclosed herein are a system and method of mitigating errors in a device. The system includes a controller including a processor and tangible, non-transitory memory on which is recorded instructions for executing a method. A propulsion source is configured to apply a propulsion torque to the device in response to a command by the controller. Execution of the instructions by the processor causes the controller to determine if at least one predefined enabling condition is met. If the at least one predefined enabling condition is met, then the controller is configured to determine if a speed of the device is at a target speed. The controller is configured to control operation of the device based at least partially on the speed of the device. If the speed of the device is above or below the target speed, then the controller is configured to determine a propulsion torque sufficient to bring the device to the target speed, based at least partially on feedback from at least one external force sensor. The propulsion torque is delivered to accelerate or decelerate the device, via the propulsion source.

In one embodiment, the target speed is approximately zero. The controller may be configured to generate a speed trajectory to bring the device to the target speed. The propulsion source may include one or more electric motors. The device may include an energy storage unit configured to power the propulsion source. The external force sensor may be a wind sensor configured to detect a strength and direction of wind relative to the device. The external force sensor may be a grade sensor configured to detect an incline of a surface relative to the device.

The device may include a pedal movable between a first depression zone, a second depression zone and a third depression zone. The device is configured to decelerate when the pedal is in the first depression zone. The device is configured to move at a constant speed when the pedal is in the second depression zone. The device is configured to accelerate when the pedal is in the third depression zone.

The device may include an electronic parking brake in communication with the controller and configured to selectively direct at least one electric motor to compress a first friction element against a second friction element. Controlling operation of the device may include applying the electronic parking brake, if the speed of the device is at the target speed, via the controller. The device may include an adaptive cruise control module. Controlling operation of the device may include disabling the adaptive cruise control module, if the speed of the device is at the target speed, via the controller.

A vehicle includes a controller having a processor and tangible, non-transitory memory on which is recorded instructions for executing a method of mitigating errors. A propulsion source is configured to apply propulsion torque to the vehicle in response to a command by the controller. An adaptive cruise control module is in communication with the controller. Execution of the instructions by the processor causes the controller to: determine if at least one predefined enabling condition is met. If at least one predefined enabling condition is met, then determine if a speed of the vehicle is at a target speed. Operation of the vehicle is controlled based at least partially on the speed of the vehicle. If the speed of the vehicle is above or below the target speed, the controller is configured to generate a speed trajectory and a propulsion torque sufficient to bring the vehicle to the target speed, based at least partially on feedback from at least one external force sensor. If the speed of the vehicle is above the target speed, the propulsion torque is applied to accelerate or decelerate the vehicle, via a command to the propulsion source by the controller. If the speed of the vehicle is at the target speed, the controller is configured to disable the adaptive cruise control module.

The above features and advantages and other features and advantages of the present disclosure are readily apparent from the following detailed description of the best modes for carrying out the disclosure when taken in connection with the accompanying drawings.

DETAILED DESCRIPTION

Figure 1:
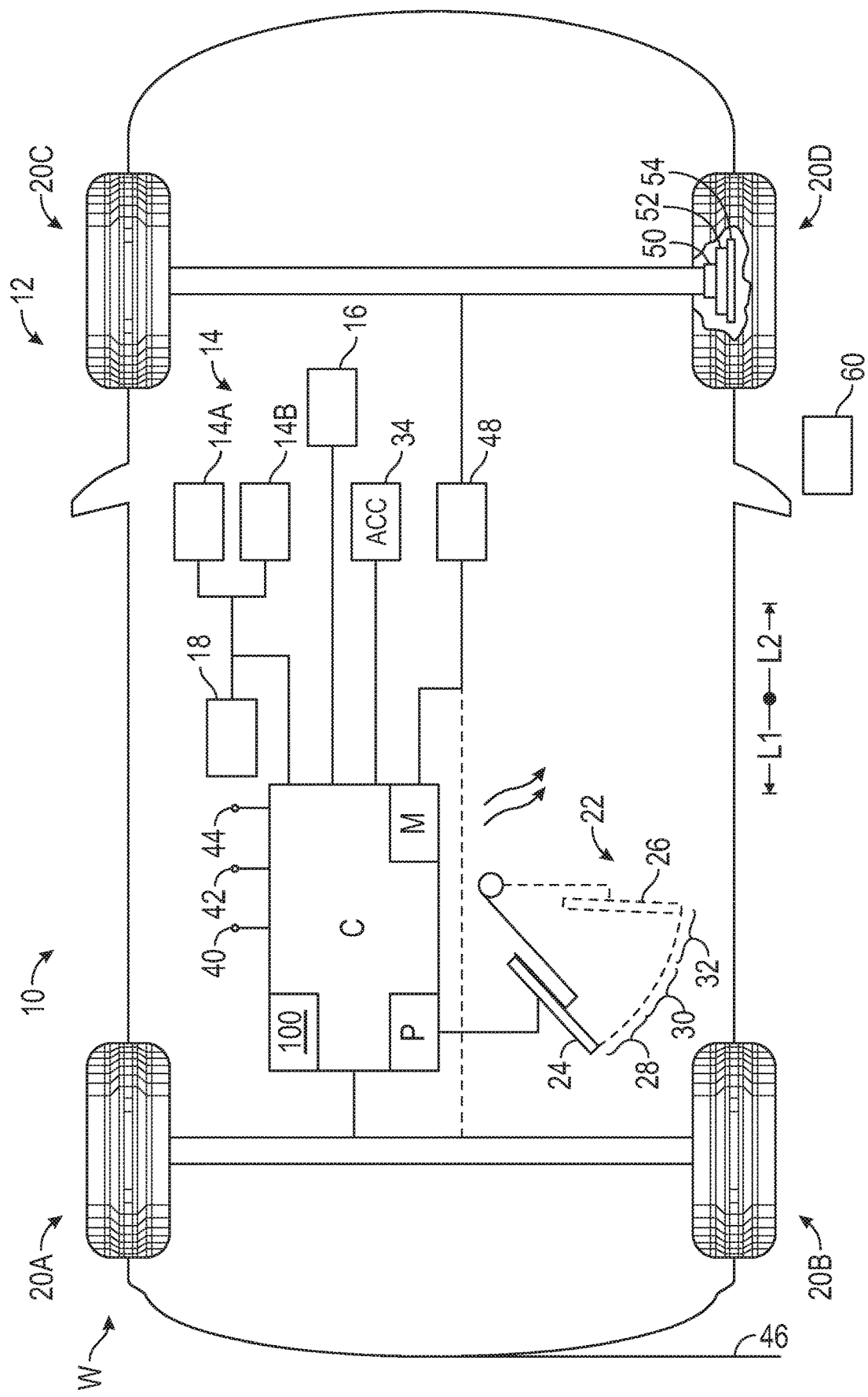
FIG. 1 is a schematic diagram of a system of mitigating errors in a device, with the device having a controller.

Referring to the drawings, wherein like reference numbers refer to like components, FIG. 1 schematically illustrates a system 10 of mitigating errors in a device 12. The device 12 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or other transportation device. The device 12 may take many different forms and include multiple and/or alternate components and facilities. In one embodiment, the device 12 is an autonomous vehicle, defined herein as a vehicle configured to autonomously execute control functions without direct operator commands.

Referring to FIG. 1, the device 12 includes a propulsion source 14 configured to generate propulsion torque to accelerate or decelerate the device 12. The propulsion source 14 may include one or more electric motors, such as first motor 14A and second motor 14B. The propulsion source 14 may be configured to provide a counteracting force in both a forward and a backward direction. For example, the propulsion source 14 may be configured to provide a first propulsion force in a first longitudinal direction L1 via the first motor 14A, and a second propulsion force in a second longitudinal direction L2, via the second motor 14B.

The device 12 may include an internal combustion engine 16. The propulsion source 14 may be part of an existing layout of the device 12 as a motor/generator, for example, where the device 12 is a hybrid vehicle or an electric vehicle. Alternatively, the propulsion source 14 may be a separate source from the motor/generator of an existing layout of the device 12, where the device 12 is a hybrid vehicle or an electric vehicle.

The propulsion source 14 may be powered by an energy storage unit 18. The energy storage unit 18 is configured to store and deliver power to the propulsion source 14 and may include, but is not limited to, a battery, fuel cell, electrical or electrochemical energy source. The propulsion torque may be delivered to one or more wheels of the device 12, such as wheels 20A, 20B, 20C and 20D shown in FIG. 1.

Referring to FIG. 1, the controller C may be configured to receive a torque request via a pedal 22. The pedal 22 is movable between a minimum pedal position 24 and a maximum pedal position 26, corresponding to 0% and 100% compression of the pedal 22. Referring to FIG. 1, in a non-limiting embodiment, the pedal 22 is configured such that when the pedal 22 is pushed to the first depression zone 28, regeneration braking decelerates the device 12. Referring to FIG. 1, when the pedal 22 is pushed to the second depression zone 30, the device 12 may be configured to cruise at a relatively constant velocity. When the pedal 22 is pushed to the third depression zone 32, the device 12 may be configured to accelerate. The pedal 22 may be configured to adjust the torque (from 0 to 100%) in some range with the depression zones 28, 30, 32 being a byproduct of that range, as well as the external forces on the device 12.

Referring to FIG. 1, the device 12 may include an adaptive cruise control module 34. The adaptive cruise control module 34 may be separate from or embedded in the controller C. The adaptive cruise control module 34 is configured to maintain a set speed for the device 12 while maintaining a predetermined distance from surrounding elements. The adaptive cruise control module 34 may employ a proximity detection sensor (not shown) available to those skilled in the art to determine proximity to the surrounding elements. For example, a radar-based device may be employed.

Referring to FIG. 1, the device 12 includes a controller C operatively connected to or in electronic communication with the propulsion source 14. The controller C includes at least one processor P and at least one memory M (or non-transitory, tangible computer readable storage medium) on which are recorded instructions for executing method 100. In the event of certain predefined errors, the method 100 utilizes propulsion torque generated by the propulsion source 14 as a mitigating action to control the device 12. For example, the device 12 could be brought to a creeping speed or complete stop to allow for subsequent permanent immobilization. In another example, the device 12 may be moving very slowly or stationary and it is desired to increase the speed to a target speed. Accordingly, the system 10 (and execution of the method 100) improves the functioning of the device 12.

The memory M can store controller-executable instruction sets, and the processor P can execute the controller-executable instruction sets stored in the memory M. The method 100 provides flexible control in that the device 12 may be accelerated or decelerated at various rates, with smooth transitions between the two. The method 100 provides a pleasing mitigation action in certain situations, such as when autonomous or semi-autonomous features are unable to function. The method 100 may employ feed forward or feedback control.

Figure 2:
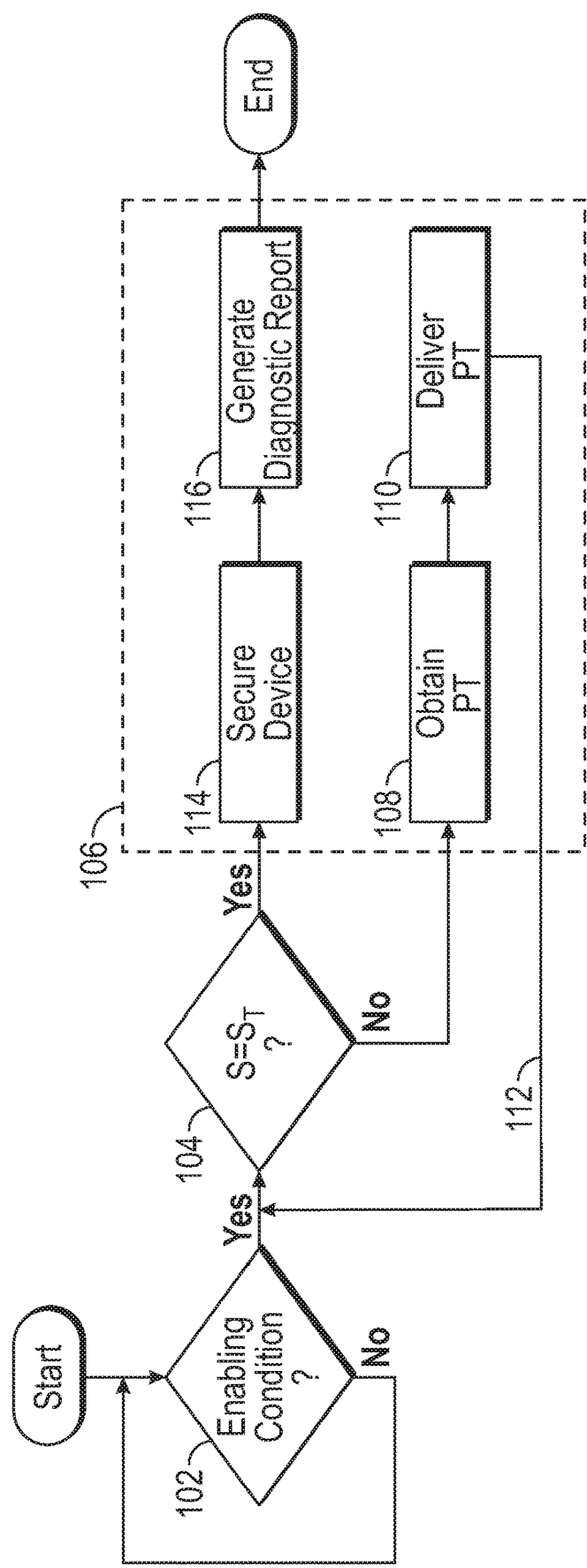
FIG. 2 is a schematic flow diagram for of a method executable by the controller of FIG. 1.

Referring now to FIG. 2, a flowchart of the method 100 stored on and executable by the controller C of FIG. 1 is shown. Method 100 need not be applied in the specific order recited herein. Furthermore, it is to be understood that some steps may be eliminated. Referring to FIG. 2, method 100 may begin with block 102, where the controller C is programmed or configured to determine if at least one predefined enabling condition is met. The predefined enabling condition may include an error in the functioning of the adaptive cruise control module 34. The predefined enabling condition may include a malfunction in an autonomous or semi-autonomous feature. In one example, the predefined enabling condition is a friction brake unit being unavailable or insufficiently functional, such as for example, in cold temperatures where brake rotor freezing may occur. The predefined enabling condition may be selected based on the application at hand.

If the at least one predefined enabling condition is met, then the method 100 proceeds to block 104 of FIG. 2, where the controller C is configured to determine if a speed of the device 12 is at a target speed ("$S_T$" in FIG. 2). The controller C may determine the speed of the device 12 via a speed sensor 40 or in other ways, including via "virtual sensing" and modeling based on other measurements and using sensors at various locations. In one embodiment, the target speed is approximately zero. In another embodiment, the target speed is approximately 10 km/hour. The controller C is configured to control operation of the device 12 based at least partially on the speed of the device 12, per block 106.

If the speed of the device 12 is above or below the target speed, the method 100 proceeds to block 108 of FIG. 2, where the controller C is configured to determine a propulsion torque ("PT" in FIG. 2) sufficient to bring the device 12 to the target speed, based at least partially on the speed and feedback from at least one external force sensor. Additionally, in block 108, the controller C may be configured to generate a speed trajectory (such as speed trajectory 206, described below with respect to FIG. 3) for the device 12 to reach the target speed.

The controller C may receive inputs from various external force sensors available to those skilled in the art, including but not limited to: a speed sensor 40, a wind sensor 42 and a grade sensor 44, shown in FIG. 1. Referring to FIG. 1, the wind sensor 42 is configured to detect a strength and direction of a wind W relative to the device 12. A grade sensor 44 is in communication with the controller C and configured to detect an incline of a road surface 46 relative to the device 12 on which the device 12 is positioned.

In block 110 of FIG. 2, the propulsion torque ("PT" in FIG. 2) is delivered or applied to the device 12, via a command by the controller C to the propulsion source 14. Per line 112, the method 100 proceeds from block 110 to block 104 to re-determine if the speed of the device 12 is above the target speed. If the speed of the device 12 is at or below the target speed, the method 100 proceeds to block 114 of FIG. 2, where the controller C is configured to secure the device 12.

In one embodiment, the device 12 may be secured by disabling one or more features, such as for example, disabling the adaptive cruise control module 34. In another embodiment, the device 12 may be secured by applying an electronic parking brake 48, shown in FIG. 1. The device 12 may include a first friction element 52 and a second friction element 54 mechanically linked to at least one of the wheels 20A, B, C and D. The electronic parking brake 48 is in communication with the controller C and configured to selectively direct at least one electric motor 50 to compress the first friction element 52 against the second friction element 54. Each of the wheels 20A, B, C and D may include separate respective friction elements.

Controlling operation of the device 12 may include generating a diagnostic signal by the controller C, as shown in block 116. The diagnostic signal may be in a number of formats. For example, the diagnostic signal may include a diagnostic report generated by the controller C or a message displayed on an instrument panel of the device 12. The diagnostic report may be sent as a wireless signal by the controller C to a remote server 60. The remote server 60 may be accessible by a fleet manager of the device 12. The controller C may include one or more wireless transceivers for performing wireless communication and one or more communication ports for performing wired communication. The remote server 60 may include a processing device, a communication device, and memory device.

Figure 3:
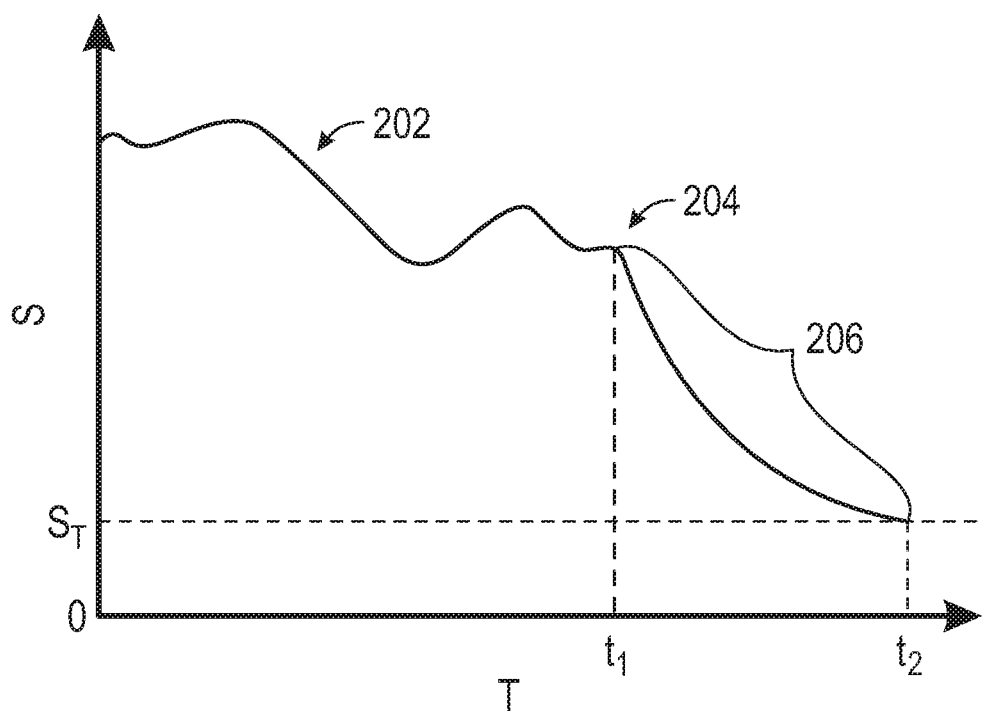
FIG. 3 is schematic graph of speed over time for the device of FIG. 1, including a speed trajectory generated by the controller.

FIG. 3 shows an example speed trajectory 206 generated by the controller C to bring the device 12 to the target speed ($S_T$ on the vertical axis). FIG. 3 is a schematic graph of speed (S on the vertical axis) over time (T on the horizontal axis) for the device 12. At time step 202 of FIG. 3, the device 12 is controlled by an autonomous feature. At time step 204, a fault or error occurs with the autonomous driving feature, meeting one of the predefined enabling conditions and triggering block 104 of the method 100. Between times $t_1$ and $t_2$, the controller C (via execution of method 100) is configured to bring the device 12 to the target speed ($S_T$) using propulsion torque generated by the propulsion source 14. The shape of the speed trajectory 206 may vary based on the application at hand, including but not limited to: parabolic, elliptical and linear (straight line).

In summary, the method 100 includes the use of propulsion torque for closed-loop speed control as a mitigating action, which allows the device 12 to stop or reduce to a target speed. The method 100 may be dynamically executed. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The flowchart in FIG. 2 illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by particular purpose hardware-based systems that perform the specified functions or acts, or combinations of particular purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The controller C of FIG. 1 may be an integral portion of, or a separate module operatively connected to, other controllers of the device 12. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or the FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of mitigating errors in a device, the system comprising:
   a controller including a processor and tangible, non-transitory memory on which is recorded instructions for executing a method;
   a propulsion source configured to apply a propulsion torque to the device in response to a command by the controller;
   wherein the device includes a pedal movable between a first depression zone, a second depression zone and a third depression zone, the device being configured to decelerate when the pedal is in the first depression zone;

wherein the device is configured to move at a constant speed when the pedal is in the second depression zone and accelerate when the pedal is in the third depression zone;

wherein execution of the instructions by the processor causes the controller to:

determine if at least one predefined enabling condition is met;

if the at least one predefined enabling condition is met, then determine if a speed of the device is at a target speed; and control operation of the device based at least partially on the speed of the device, including, if the speed of the device is above or below the target speed, then:

determine the propulsion torque sufficient to bring the device to the target speed, based at least partially on feedback from at least one external force sensor; and apply the propulsion torque to accelerate or decelerate the device, via the command to the propulsion source.

2. The system of claim 1, wherein the target speed is approximately zero.

3. The system of claim 1, wherein the controller is configured to generate a speed trajectory to bring the device to the target speed, if the speed of the device is above or below the target speed.

4. The system of claim 1, wherein:
the propulsion source includes one or more electric motors; and
the device includes an energy storage unit configured to power the propulsion source.

5. The system of claim 1, further comprising:
an electronic parking brake in communication with the controller and configured to selectively direct at least one electric motor to compress a first friction element against a second friction element;
controlling operation of the device includes applying the electronic parking brake, if the speed of the device is at the target speed, via the controller.

6. The system of claim 1, wherein:
the device includes an adaptive cruise control module; and
controlling operation of the device includes disabling the adaptive cruise control module, if the speed of the device is at the target speed, via the controller.

7. The system of claim 1, wherein the at least one external force sensor includes a wind sensor configured to detect a strength and direction of wind relative to the device.

8. The system of claim 1, wherein the at least one external force sensor includes a grade sensor configured to detect an incline of a surface relative to the device.

9. A method for mitigating errors in a device having a propulsion source and controller with a processor and tangible, non-transitory memory, the method comprising:

determining if at least one predefined enabling condition is met;

if the at least one predefined enabling condition is met, then determining if a speed of the device is at a target speed;

providing a pedal in the device, the pedal being movable between a first depression zone, a second depression zone and a third depression zone, configuring the device to decelerate when the pedal is in the first depression zone;

configuring the device to move at a constant speed when the pedal is in the second depression zone and accelerate when the pedal is in the third depression zone;

controlling operation of the device based at least partially on the speed of the device, including, if the speed of the device is above or below the target speed, then:

determining a propulsion torque sufficient to bring the device to the target speed, based at least partially on feedback from at least one external force sensor;

generating the propulsion torque, via a command from the controller to the propulsion source; and delivering the propulsion torque to accelerate or decelerate the device, via the propulsion source.

10. The method of claim 9, wherein the target speed is approximately zero.

11. The method of claim 9, wherein the controller is configured to generate a speed trajectory to bring the device to the target speed.

12. The method of claim 9, wherein:
the propulsion source includes one or more electric motors; and
the device includes an energy storage unit configured to power the propulsion source.

13. The method of claim 9, wherein the device includes an electronic parking brake in communication with controller and wherein:
if the speed of the device is at the target speed, controlling operation of the device includes applying the electronic parking brake, via the controller, the electronic parking brake being configured to selectively direct at least one electric motor to compress a first friction element against a second friction element.

14. The method of claim 9, wherein the device includes an adaptive cruise control module in communication with the controller and wherein:
if the speed of the device is at the target speed, controlling operation of the device includes disabling the adaptive cruise control module, via the controller.

15. The method of claim 9, wherein the at least one external force sensor includes a wind sensor configured to detect a strength and direction of wind relative to the device.

16. The method of claim 9, wherein the at least one external force sensor includes a grade sensor configured to detect an incline of a surface relative to the device.

17. A vehicle comprising:
a controller including a processor and tangible, non-transitory memory on which is recorded instructions for executing a method of mitigating errors;
a propulsion source configured to apply propulsion torque to the vehicle in response to a command by the controller;
an adaptive cruise control module in communication with controller;
wherein the device includes a pedal movable between a first depression zone, a second depression zone and a third depression zone, the device being configured to decelerate when the pedal is in the first depression zone;
wherein the device is configured to move at a constant speed when the pedal is in the second depression zone and accelerate when the pedal is in the third depression zone;
wherein execution of the instructions by the processor causes the controller to:
determine if at least one predefined enabling condition is met;
if the at least one predefined enabling condition is met, then determine if a speed of the vehicle is at a target speed; and control operation of the vehicle based at least partially on the speed of the vehicle, including:
   if the speed of the vehicle is above or below the target speed, generate a speed trajectory and a propulsion torque sufficient to bring the vehicle to the target speed, based at least partially on feedback from at least one external force sensor and apply the propulsion torque to accelerate or decelerate the vehicle, via the command to the propulsion source; and
   if the speed of the vehicle is at the target speed, disable the adaptive cruise control module, via the controller.

* * * * *